(12) United States Patent
Payne

(10) Patent No.: US 7,009,741 B2
(45) Date of Patent: Mar. 7, 2006

(54) COMPUTATION OF COMPUTER GENERATED HOLOGRAMS

(75) Inventor: Douglas Payne, Farnborough (GB)

(73) Assignee: Qinetiq Limited, London (GB)

( * ) Notice: Subject to any disclaimer, the term of this patent is extended or adjusted under 35 U.S.C. 154(b) by 125 days.

(21) Appl. No.: 10/488,502

(22) PCT Filed: Aug. 29, 2002

(86) PCT No.: PCT/GB02/03938
§ 371 (c)(1),
(2), (4) Date: Mar. 3, 2004

(87) PCT Pub. No.: WO03/025680
PCT Pub. Date: Mar. 27, 2003

(65) Prior Publication Data
US 2004/0233487 A1   Nov. 25, 2004

(30) Foreign Application Priority Data
Sep. 14, 2001  (GB) ................................. 0122271

(51) Int. Cl.
G03H 1/08  (2006.01)
(52) U.S. Cl. .............................. 359/9; 359/23; 382/237
(58) Field of Classification Search .................... 359/1, 359/9, 22, 23; 382/237; 341/56
See application file for complete search history.

(56) References Cited

U.S. PATENT DOCUMENTS

| | | | |
|---|---|---|---|
| 5,237,433 A | | 8/1993 | Haines et al. |
| 6,269,170 B1 | | 7/2001 | Horikoshi et al. |
| 6,366,368 B1 | * | 4/2002 | Horimai ......................... 359/9 |
| 6,771,402 B1 | * | 8/2004 | Snider ............................ 359/9 |
| 2005/0088712 A1 | * | 4/2005 | Young ............................ 359/9 |

OTHER PUBLICATIONS

Lohmann et al: "Graphic Codes for Computer Holography"; Applied Optics, Optical Society of America, Washington, US. vol. 34, No. 17, Jun. 10, 1995, pp. 3172-3178, XP000505704.

Jennison et al: "Iterative Approaches to Computer-Generated Holography"; Optical Engineering, Soc. Of Photo-Optical Instrumentation Engineers. Bellingham. US, vol. 28.No. 6, Jun. 1, 1989, pp. 629-637, XP000026303.

Chang et al: "Iterative Interlacting Error Diffusion for Synthesis of Computer-Generated Holograms"; Applied Optics. Optical Society of America. Washington, US, vol. 32, No. 17, Jun. 10, 1993, pp. 3122-3129, XP000345883.

* cited by examiner

*Primary Examiner*—Leonidas Boutsikaris
(74) *Attorney, Agent, or Firm*—Nixon & Vanderhye P.C.

(57) ABSTRACT

A method of computing a computer generated hologram (CGH) for use in displaying a holographic image of a replay object. The method of generating a first computer generated hologram corresponding to the desired replay object (step 1); subdividing the first computer generated hologram into a plurality of blocks, each representing a sub CGH (step 2); for each block or sub CGH, calculating the corresponding replay sub-image hereafter called target wavefront data set (step 3); and generating for each target wavefront data set a second constrained modulation computer generated hologram wherein that second CGH is modulated within constrained values (step 5); and combining the plurality of second constrained modulation computer generated holograms to provide a third complete constrained modulation computer generated hologram (step 6).

9 Claims, 3 Drawing Sheets

COMPUTATION OF COMPUTER GENERATED HOLOGRAMS

This application is the US national phase of international application PCT/GB02/03938, filed in English on 29 Aug. 2002, which designated the US. PCT/GB02/03938 claims priority to GB Application No. 0122271.0 filed 14 Sep. 2001. The entire contents of these applications are incorporated herein by reference.

The present invention relates to the computation of computer generated holograms.

It is well known that a three-dimensional image may be presented by forming an interference pattern or hologram on a planer surface. The three-dimensional image is visible when the hologram is appropriately illuminated. Recently, interest has grown in so-called computer generated holograms (CGHs) which offer the possibility of displaying high quality images, which need not be based upon real objects, with appropriate depth cues and without the need for viewing goggles. Interest is perhaps most intense in the medical and design fields where the need for realistic visualisation techniques is great.

Typically, a computer generated hologram involves the generation of a matrix of data values (each data value corresponding to a light transmission level) which simulates the hologram which, might otherwise be formed on a real planer surface. The matrix is applied to a Spatial Light Modulator (SLM) which may be, for example, a two-dimensional array of liquid crystal elements or of acousto-optic modulators. Coherent light is directed onto the SLM using for example a laser such that the resulting output, either reflected from the SLM or transmitted through the SLM, is a modulated light pattern. An example of an SLM is an Electrically Addressable SLM (EASLM).

FIG. 1 illustrates a simplified system for producing a holographic image using a CGH. Light from a point source 1 is collimated by optics 2 and directed towards a beam-splitter 3. Light is reflected by the beamsplitter 3 onto the surface of a spatial light modulator (SLM) 4 which is used to display the CGH. Replay optics 5, 6 direct light reflected from the SLM 4 to an image region where the image 7 is displayed. A so-called conjugate image 8 also appears in this region. In this arrangement, the SLM 4 may be an optically addressed SLM or an electrically addressed SLM.

An ideal CGH has complex light modulation, where 'complex' is referring to complex numbers (with real and imaginary parts) which can be used to describe both the amplitude and phase of the light. In principle, such a CGH would be capable of replaying a perfect image. Previously reported algorithms capable of designing such a CGH include the Coherent Ray Trace (CRT), the Ping-pong method and the Diffraction Specific (DS) method. CRT and the Ping-pong method involve propagating light reflected from a simulated 3D object to a CGH plane. The amplitude and phase of the wavefront at the CGH plane is then used to determine the CGH pixel transmission values. CRT makes use of ray tracing to calculate the propagation of the wavefront whilst the Ping-pong method makes use of Fourier transforms. The DS method is different in that it makes use of pre-computed look-up tables to determine the CGH pixel transmission values that will enable a particular 3D image to be displayed.

It is very difficult to obtain fully complex SLMs. SLMs suitable for the display of CGHs typically have constrained light modulation abilities. For example they may only be able to modulate the amplitude of light or only its phase. It is particularly desirable to be able to display CGHs on SLMs with only binary modulation (each pixel having only an on or off state) as these are relatively simple to fabricate. Constraining the light modulation values of the CGH so that it may be displayed on such SLMs generally results in an increase in noise in the replayed image. An intuitive explanation for this is that constrained modulation CGHs contain less 'information'.

Algorithms exist that enable constrained modulation CGHs to be designed that replay images either with reduced noise or where the location of the noise can be controlled, e.g. shifted away from the target image. For example, Projection Onto Constraint Sets (POCS) and Direct Binary Search (DBS) can be used to generate a suitably constrained CGH. These algorithms rely upon the use of a "target image" in order to design the final CGH. The hologram is optimised so that it results in the replay of an image as close as possible to the target image (some form of merit function is used to measure the quality/fidelity of the replay). This process places an additional heavy load on the available computer processing power, particularly as binarising algorithms which produce low noise results tend to be iterative.

The 'target image' is typically a complex wavefront in some 2D region of space. It is described simply by a matrix of complex numbers representing the amplitude and phase of the wavefront at sample points. When this wavefront propagates through space and is detected by a viewer's eyes, a 3D image is perceived as though the wavefront had originated from a real 3D object. This target image may be determined from the replay of a CGH designed by the CRT, Ping-pong or DS algorithms.

For a display system based on a CGH, the complexity of the SLM, in terms of the number of pixels required, is determined both by the required image size and angle of view (the angle over which the 3D image can be seen by a viewer). Particularly for multi-viewer systems, which tend to need large viewing angles, this results in a need for large numbers of pixels (e.g. $10^{10}$ pixels for a workstation application). Even for extremely powerful computers, the complete computation process, that may include ray tracing and binarisation with POCS, can take many hours, making the near real time generation of high quality CGHs very challenging.

Attempts have been made to break the CGH computation process into smaller blocks to make the problem more tractable. These involve calculating a number of small sub-holograms or sub-CGHs which are then "stitched" together to form the final desired large CGH. For example, the article "Iterative interlacing approach for synthesis of computer generated holograms", O. K. Ersoy, J. Y. Zhuang & J. Brede, Applied Optics, Vol.31 No.32, November 1992, describes a process in which a first sub-hologram is designed which provides a noisy image. Further sub-holograms are added which successively reduce noise. This process however requires sequential processing of the sub-holograms and is not suited to parallel processing. Other approaches are described in "Fast decimation in frequency direct binary search algorithms for synthesis of computer generated holograms", J-K. Zhuang & O. K. Ersoy, J.Opt.Soc.Am.A, Vol.11, No.1, January 1994; "Optimal decimation in frequency iterative interlacing technique for synthesis of computer generated holograms", J-Y. Zhuang & O. K. Ersoy, J.Opt.Soc.Am.A, Vol.12 No.7, July 1995; and "Error reduction of quantised kinoforms by means of increasing the kinoform size", S. Yang & T. Shimomura, Applied Optics, Vol.37 No.29, October 1998.

According to a first aspect of the present invention there is provided a method of computing a computer generated hologram for use in displaying a holographic image of a replay object, the method comprising the steps of:

calculating a plurality of target wavefront data sets, each representing a replayed block of a single large hologram corresponding to the desired replay object;

generating a constrained modulation computer generated hologram for each target wavefront data set; and combining the plurality of constrained modulation computer generated holograms to provide a complete, constrained modulation computer generated hologram.

According to a second aspect of the present invention there is provided a method of computing a computer generated hologram for use in displaying a holographic image, the method comprising the steps of:

generating a first computer generated hologram corresponding to a desired replay object;

subdividing the first computer generated hologram into a plurality of blocks;

for each block, generating a target wavefront data set, and generating a second constrained modulation computer generated hologram for each target wavefront data set; and combining the plurality of second constrained modulation computer generated holograms to provide a third complete constrained modulation computer generated hologram.

Embodiments of the present invention provide an efficient method for designing constrained modulation holograms. As the hologram is broken up into a number of sub-sections each of which is independently designed using its own unique replay target, the method can employ powerful parallel processing techniques in order to increase computation speed and to scale to large image sizes.

It will be appreciated that the data for the desired replay object may be obtained from a real object, captured for example using a digital imaging system, or it may be simulated, generated for example using a computer aided design process.

The step of generating a first computer generated hologram corresponding to the replay object may comprise using the CRT, DS or ping-pong algorithm to produce a full complex modulation or grey scale amplitude modulation computer generated hologram.

The step of generating a target wavefront data set for each block of the first computer generated hologram may comprise performing an inverse Fourier Transform on each block. For each target wavefront data set, a target object may be extracted from each simulated image. This may involve cropping the target wavefront data set to remove the area surrounding the target object. Typically, the blocks will all be the same size although this need not be the case.

The step of generating a second constrained computer generated hologram for each extracted target object may comprise generating a binarised computer generated hologram. An algorithm such as POCS or DBS may be used.

Preferably, the processing steps applied to each block of the first computer generated hologram are carried out in parallel with those applied to the other blocks.

According to a second aspect of the present invention there is provided an electronic storage medium having stored thereon a computer generated hologram computed using the method of the first aspect of the present invention.

For a better understanding of the present invention and in order to show how the same may be carried into effect reference will now be made, by way of example, the accompanying drawings, in which.

A display for displaying a holographic image using a computer generated hologram (CGH) has been described with reference to FIG. 1. There will now be described a method of generating a CGH for use with such a display (or other types of holographic display).

Figure 2:
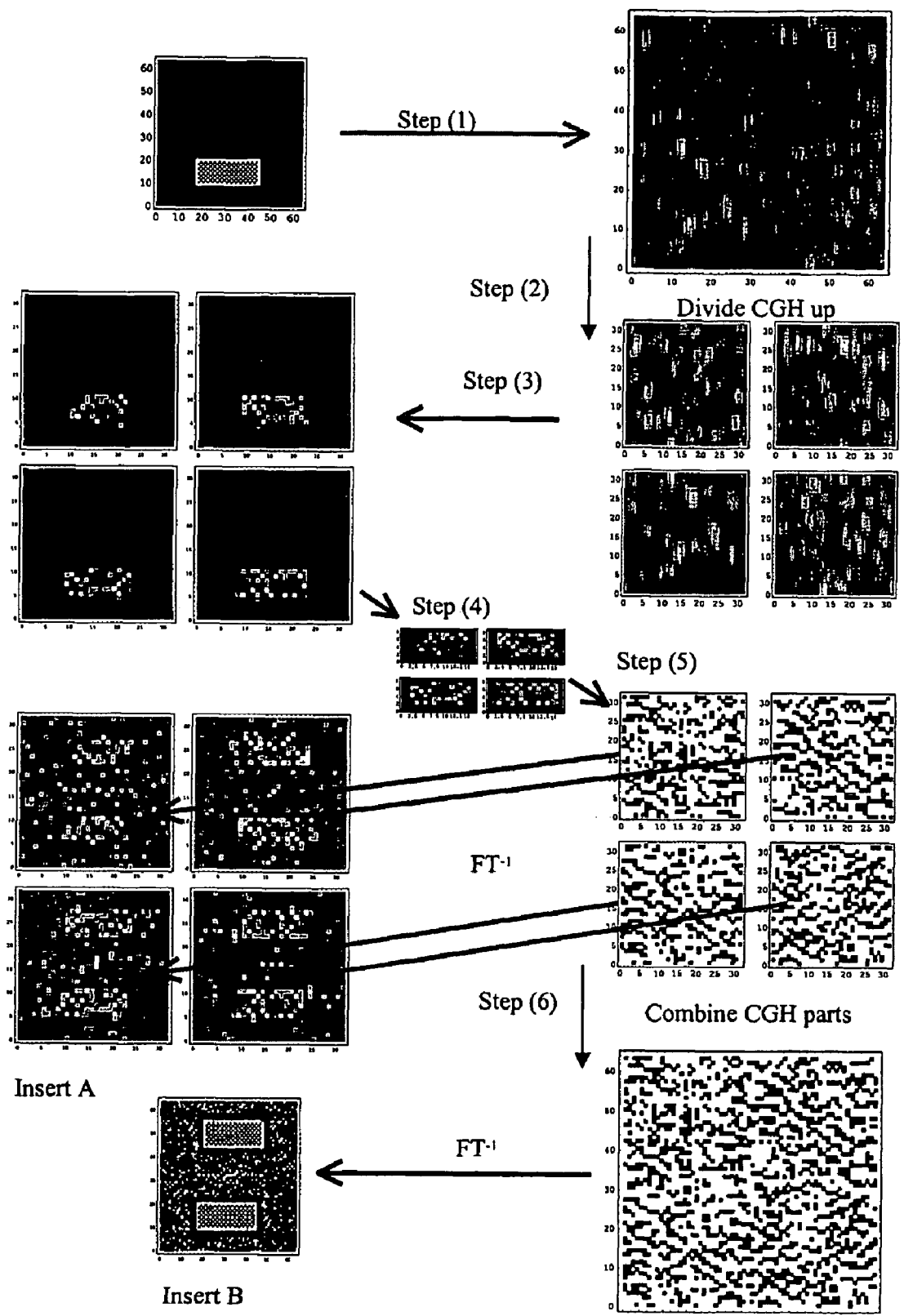
FIG. 2 illustrates certain steps in the computation of a computer generated hologram.
Figure 3:
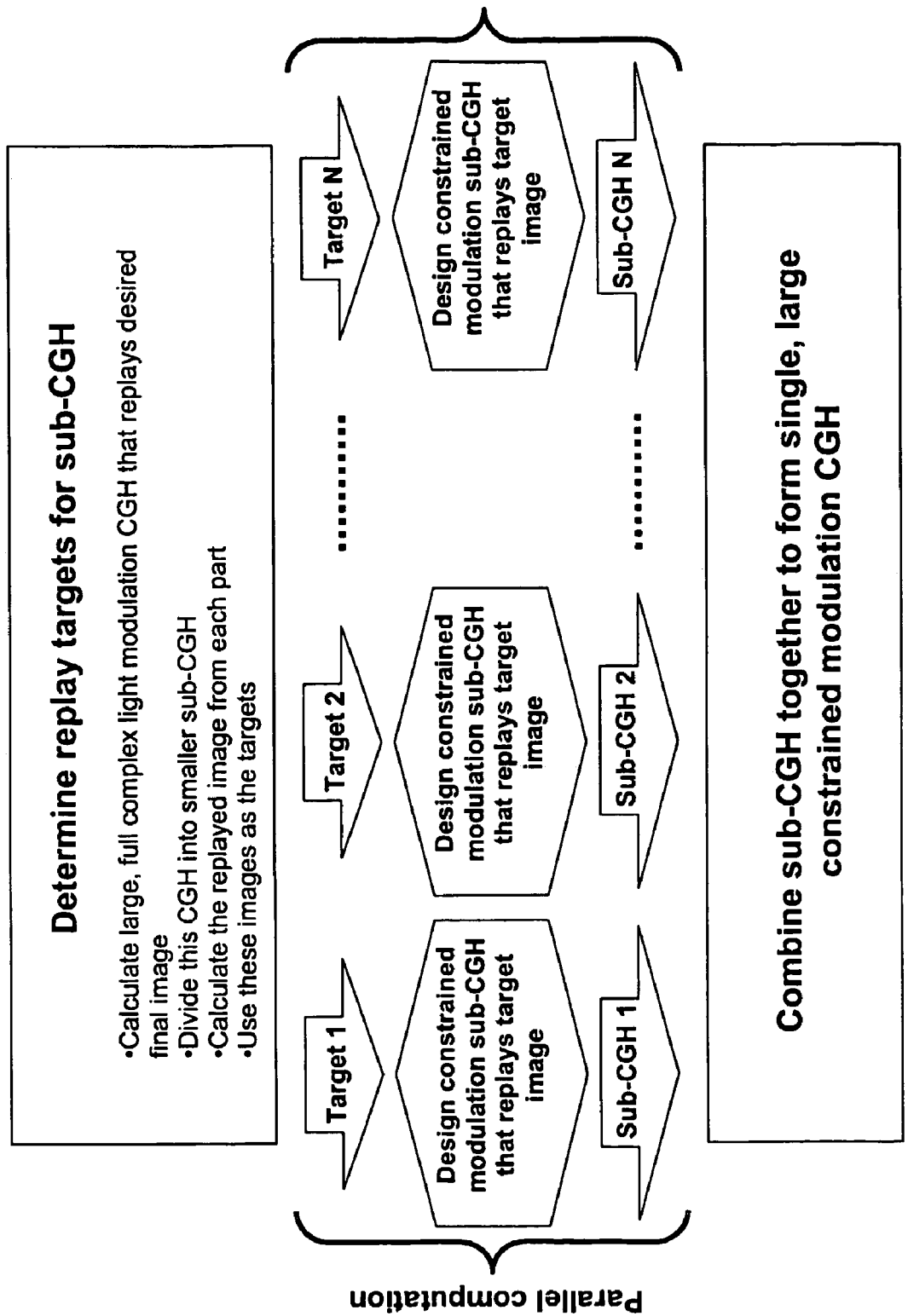
FIG. 3 is a flow diagram illustrating a method of generating a computer generated hologram suitable for implementation on a parallel processing architecture computer.

The starting point for the CGH generation process is a desired replay object for which it is desired to generate the CGH. In this example, the object is surrounded by a zero padded area. This is done in anticipation that an empty region is going to be required to locate 'binarisation noise'. Typically this object is a simulated object held in the memory of a computer. For example, the object may be a car designed using a CAD application. The 3D spatial co-ordinates of the object are known. For reasons of simplicity and to more clearly illustrate the CGH computation process, the replay object illustrated in FIG. 2 is a 2D rectangular "chequer board".

Using a method such as CRT (Cameron C D, Pain D A, Slinger C W, "Computational challenges of emerging novel true 3D holographic displays", SPIE Vol.4109. August 2000) or the ping-pong method (Ichioka Y, Izumi M, Suzuki Y, "Scanning halftone plotter and computer-generated continuous tone hologram", Appl.Opt. 10, 403–11, 1971), a "perfect" CGH is generated which may be a full complex modulation or at least grey scale amplitude modulation, as illustrated by step (1) in FIG. 2. Each point in the CGH comprises a real and imaginary component (or amplitude and phase component). If it were possible to provide a complex modulation or grey scale amplitude SLM then this CGH could of course be used directly to display the target image. However, in practice it is very desirable to be able to use binary SLMs. The CGH must therefore be binarised (i.e. each pixel value converted to a binary on/off value). This process is illustrated in steps (2) to (6) of FIG. 2.

In step (2), the CGH is sub-divided into four equally sized blocks. In step (3) an inverse Fourier Transform is applied individually to each of the blocks of the CGH to generate corresponding replay sub-images (target wavefront data sets). As the information contained in the target object is distributed across the entire CGH, applying an inverse Fourier Transform to each block will result in a matrix of complex values which is a representation of the object which appears to be sampled at a very low rate. The chequer board patter is unrecognisable in this representation.

In step (4), each of the sub-images is cropped to remove the area surrounding the target object. It will be appreciated that this process may be applied in parallel to the blocks as there is no interdependency between them, i.e. the process applied to one of the blocks does not rely upon the results of the process applied to any of the others.

In step (5), each of the cropped images is used as the target replay image in the design of a corresponding binarised sub-CGH using the POCS algorithm (Jennison B K, Allebach J P, Sweeney D W, "Iterative approaches to computer-generated holography", Optical Engineering, Vol.28, no.6, p.629–37, 1989). Note that each target image consists of a matrix of complex values. Only the amplitude is shown in the Figure. Each binarised sub-CGH consists of a matrix of binary values set to indicate whether the corresponding pixel is on or off. (If an inverse Fourier Transform is applied to each of the blocks, an image of the target object can be recovered as shown at insert A). A conjugate image is also contained in the transformed data. In step (6), the four binarised sub-CGHs are abutted together to form a single binarised CGH.

Figure 1:
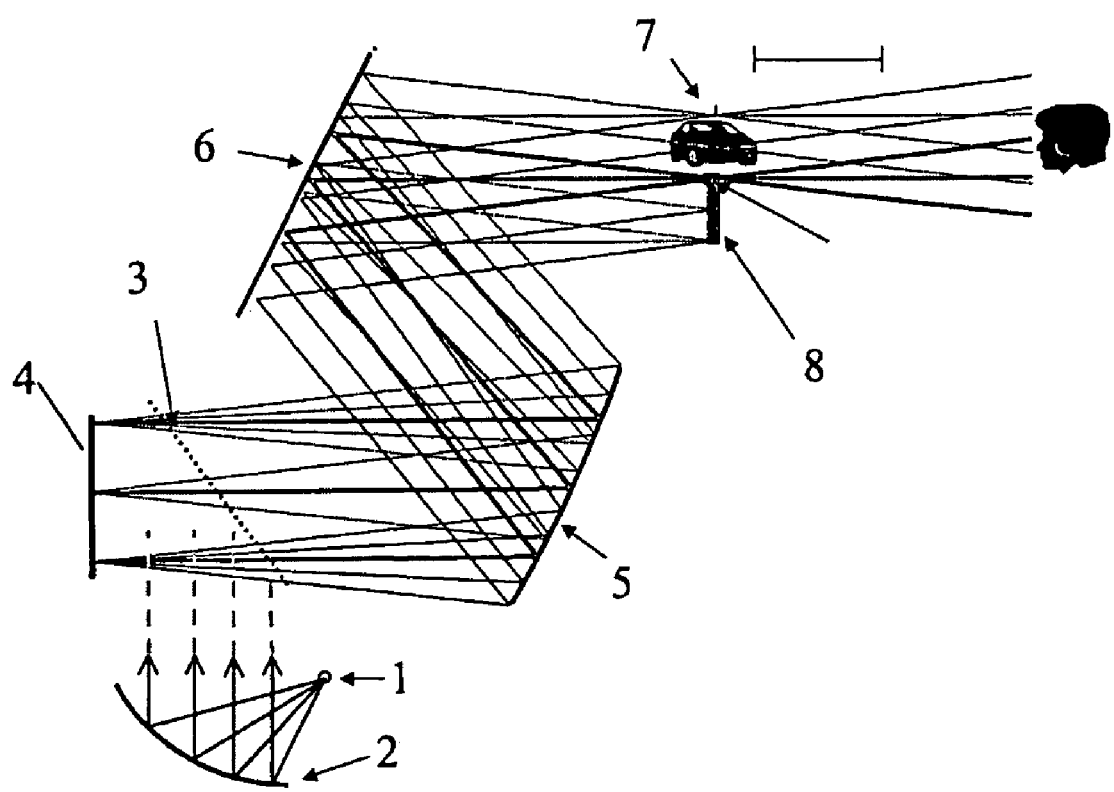
FIG. 1 illustrates schematically a simplified holographic display.

When the CGH is displayed on a SLM such as that of the holographic display of FIG. 1, the image which is displayed corresponds to that shown in insert B of FIG. 2 (the replay of the CGH effectively performs an inverse Fourier Transform on the CGH). As well as the target object, a conjugate image appears. Both images are surrounded by noise. Whilst the presence of noise may in many circumstances be unimportant (for example where it is desired to display a hologram of a car floating in space), the effect of the noise can be reduced by viewing the hologram through a screen designed to allow only the area of the target object to be viewed. The same technique can be used to blank out the conjugate image.

It will be appreciated by the person of skill in the art that various modifications may be made to the above described embodiments without departing from the scope of the present invention. For example, it is possible that the algorithm (e.g. CRT or DS) used to design the CGH may also be parallelised such that each block, from which the target images are obtained, is calculated in parallel. If the SLM is addressed in parallel (e.g. blocks of the SLM can be updated simultaneously), then the step of combining the binarised sub-CGH into a single large CGH within the computer itself is unnecessary. Instead, each sub-CGH is written directly to the appropriate position on the SLM. In effect, the sub-CGH are butted together when they are displayed on the SLM.

What is claimed is:

1. A method of computing a computer generated hologram for use in displaying a holographic image of a replay object, the method comprising the steps of:
   calculating a plurality of target wavefront data sets, each representing a replayed block of a single large hologram corresponding to the desired replay object;
   generating a constrained modulation computer generated hologram for each target wavefront data set; and
   combining the plurality of constrained modulation computer generated holograms to provide a complete, constrained modulation computer generated hologram.

2. A method of computing a computer generated hologram for use in displaying a holographic image, the method comprising the steps of:
   generating a first computer generated hologram corresponding to the desired replay object;
   subdividing the first computer generated hologram into a plurality of blocks;
   for each block, generating a target wavefront data set, and generating a second constrained modulation computer generated hologram for each target wavefront data set; and
   combining the plurality of second constrained modulation computer generated holograms to provide a third complete constrained modulation computer generated hologram.

3. A method according to claim 2, wherein the step of generating a first computer generated hologram corresponding to the replay object comprises using the Coherent Ray Trace (CRT), Diffraction Specific (DS) or ping-pong algorithms to produce a full complex modulation or grey scale amplitude modulation computer generated hologram.

4. A method according to claim 2, wherein the step of generating a target wavefront data set for each block of the first computer generated hologram comprises performing a Fourier Transform or an inverse Fourier Transform on each block.

5. A method according to claim 4, wherein the step of generating a target wavefront data set comprises cropping the corresponding transformed data.

6. A method according to claim 2, wherein the step of generating a second constrained modulation computer generated hologram comprises generating a binarised computer generated hologram.

7. A method according to claim 6, wherein the step of generating a binarised computer generated hologram uses the Projection Onto Constraint Sets (POCS) or Direct Binary Search (DBS) algorithms.

8. A method according to claim 1, wherein the processing steps applied to each wavefront data set are carried out in parallel with those applied to the other data sets.

9. An electronic storage medium having stored thereon a computer generated hologram computed using the method of claim 1.

* * * * *